United States Patent
Heidenreich et al.

[19]

[11] Patent Number: 6,109,659
[45] Date of Patent: Aug. 29, 2000

[54] HYDROSTATIC ROTARY UNION

[75] Inventors: David C. Heidenreich; Marcus H. Collins, both of Akron, Ohio

[73] Assignee: Power Transmission Technology, Inc., Sharon Center, Ohio

[21] Appl. No.: 09/096,907

[22] Filed: Jun. 12, 1998

[51] Int. Cl.[7] .................................................. F16L 55/00
[52] U.S. Cl. ............................ 285/13; 285/94; 285/905; 285/190; 285/329; 285/121.5
[58] Field of Search ............................... 285/190, 13, 14, 285/94, 905, 98, 272, 273, 274, 187, 329, 904, 121.5

[56] References Cited

U.S. PATENT DOCUMENTS

| 16,129 | 11/1856 | Thieme | 285/190 |
|---|---|---|---|
| 2,083,970 | 6/1937 | Walter | 285/190 |
| 2,210,088 | 8/1940 | Longfield | 285/190 |
| 2,459,643 | 1/1949 | Hartley | 285/190 |
| 3,002,769 | 10/1961 | Deubler et al. | 285/190 |
| 3,098,662 | 7/1963 | Iversen | 285/190 |
| 3,145,035 | 8/1964 | Hanback | 285/190 |
| 3,147,015 | 9/1964 | Hanback | 285/190 |
| 3,219,366 | 11/1965 | Franck | 285/190 |
| 3,967,838 | 7/1976 | Legris | 285/190 |
| 4,561,679 | 12/1985 | Choate | 285/190 |
| 4,679,829 | 7/1987 | Yanagisawa | 285/190 |
| 5,052,724 | 10/1991 | Konrad et al. | 285/190 |
| 5,080,401 | 1/1992 | Stich | 285/190 |
| 5,533,765 | 7/1996 | Williamson et al. | 285/190 |

FOREIGN PATENT DOCUMENTS

| 907782 | 3/1946 | France | 285/190 |
|---|---|---|---|
| 1608395 | 11/1990 | U.S.S.R. | 285/190 |
| 651499 | 4/1951 | United Kingdom | 285/190 |

*Primary Examiner*—Eric K. Nicholson
*Attorney, Agent, or Firm*—Renner, Kenner, Greive, Bobak, Taylor & Weber

[57] ABSTRACT

A hydrostatic rotary union has a shaft with an axial passage therethrough received within a housing having a radial passage in fluid communication with the axial passage. The shaft and housing have a radial clearance between them which establishes a squeeze film bearing and seal, when in use. End annuluses receive the oil establishing a squeeze film bearing and provide a return path to a supply source. The inner circumferential portion of the housing interfacing with the shaft is preferably of an anti-seizure material, such as bronze. Moreover, the housing and shaft are of materials of different coefficients of thermal expansion, such that excessive heat generated at the interface between the housing and shaft will cause the housing to expand away from the shaft.

19 Claims, 2 Drawing Sheets

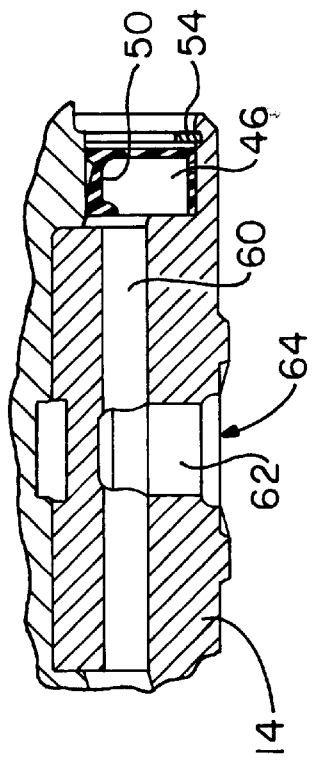
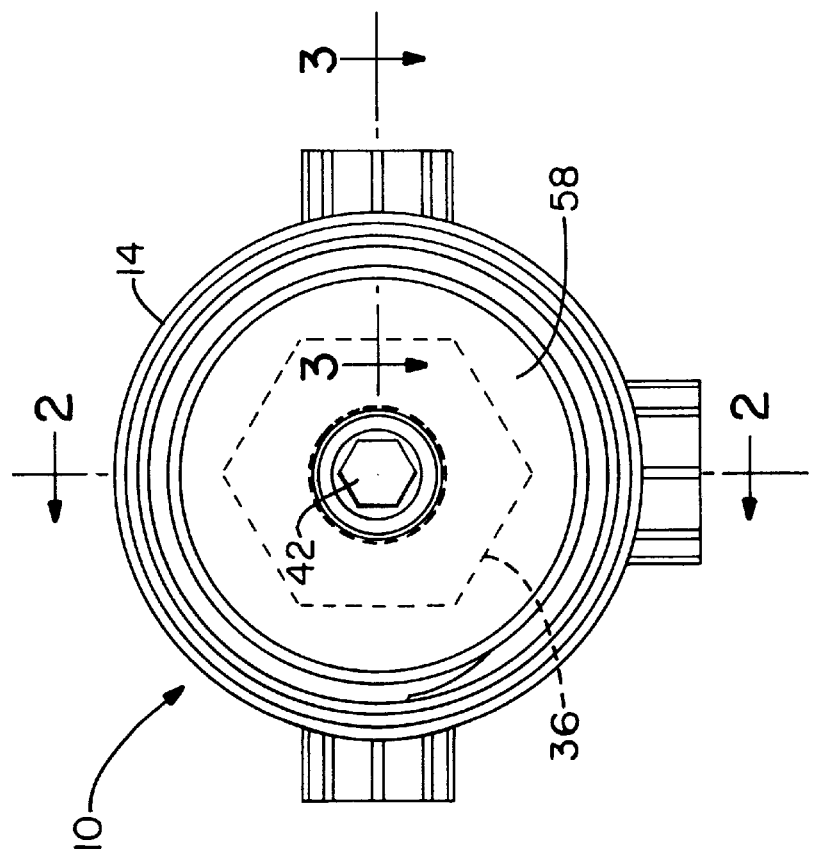

HYDROSTATIC ROTARY UNION

TECHNICAL FIELD

The invention herein resides in the art of coupling devices and, more particularly, to a rotary union adapted for fluid entry into shafts of rotating equipment for actuation and cooling of clutches and brakes, and for various purposes on other machinery. More specifically, the invention relates to a hydrostatic rotary union, eliminating the need for antifriction bearings and replacing therefor hydrostatic bearings which provide for oil squeeze film damping between the stationary and rotating parts.

BACKGROUND ART

It is well known that many types of industrial machinery require rotary unions to allow for the transfer of fluid from a stationary to a rotating element. Typically, these fluids consist of lubricants, hydraulic fluid, cooling agents, or combinations thereof. Previously known rotary unions have typically utilized antifriction bearings for support and face seals to prevent leakage. However, it has been found that both antifriction bearings and face seals have been of a limited life duration, especially in operating environments of high pressure and speed. Moreover, it has particularly been found that severe vibrations encountered in stamping press operations also shorten the life expectancy of the prior art rotary unions. Indeed, the invention herein is particularly adapted for implementation in such stamping press operations which have previously contributed to the shortened life expectancies of the prior art rotary unions.

The prior art has taught the common usage of cartridge-type in-the-shaft rotary unions to allow passage of the fluids described above. Accordingly, the rotating shaft of the machinery to which the rotary union is affixed is specifically bored and housed to receive the prior art rotary unions. It is most desirable that a rotary union, absent antifriction bearings and face seals, be provided in such a configuration as to be received in the same bores and housings.

DISCLOSURE OF INVENTION

In light of the foregoing, it is a first aspect of the invention to provide a hydrostatic rotary union which eliminates the utilization of antifriction bearings.

Another aspect of the invention is the provision of a hydrostatic rotary union which eliminates the use of face seals.

Yet another aspect of the invention is the provision of a hydrostatic rotary union which can be readily implemented in machinery presently designed and configured to employ cartridge-type in-the-shaft rotary unions or other state of the art rotary unions.

Yet another aspect of the invention is the provision of a hydrostatic rotary union which employs oil squeeze film damping to establish both a bearing and a seal between the stationary and rotary parts thereof.

Still a further aspect of the invention is the provision of a hydrostatic rotary union which allows for ease of attachment and removal thereof to the piece of industrial equipment with which it is employed.

Still a further aspect of the invention is the provision of a hydrostatic rotary union which is reliable and durable in operation and easily constructed and maintained using state of the art apparatus and techniques.

The foregoing and other aspects of the invention which will become apparent as the detailed description proceeds are achieved by a hydrostatic rotary union, comprising: a shaft having an axial passage therein; a housing having a radial passage therein, said housing receiving said shaft and said radial passage being in fluid communication with said axial passage; and wherein said shaft and housing have a radial clearance therebetween defining a squeeze film bearing therebetween.

Other aspects of the invention are achieved by a hydrostatic union, comprising: a housing having a radial passage therein; a shaft axially received in said housing, said shaft having an axial passage in communication with said radial passage, said shaft further being configured at a first end thereof to be secured from rotation by a tool; and a retainer nut received upon said first end of said shaft and maintaining said shaft in said housing.

Still further aspects of the invention are achieved by a hydrostatic rotary union, comprising: a shaft having an axial passage therein; a housing having a radial passage therein, said axial and radial passages being in communication, said housing receiving said shaft in close radial engagement and defining a squeeze film bearing and seal between said shaft and housing; and wherein said housing is made of a material having a coefficient of thermal expansion exceeding that of said shaft.

BRIEF DESCRIPTION OF THE DRAWINGS

For a complete understanding of the objects, techniques and structure of the invention reference should be made to the following detailed description and accompanying drawings wherein:

FIG. 1 is an end view of the hydrostatic rotary union made in accordance with the invention;

FIG. 3 is a partial cross sectional view of the rotary union of FIG. 1 taken along the line 3—3.

BEST MODE FOR CARRYING OUT THE INVENTION

Figure 2:
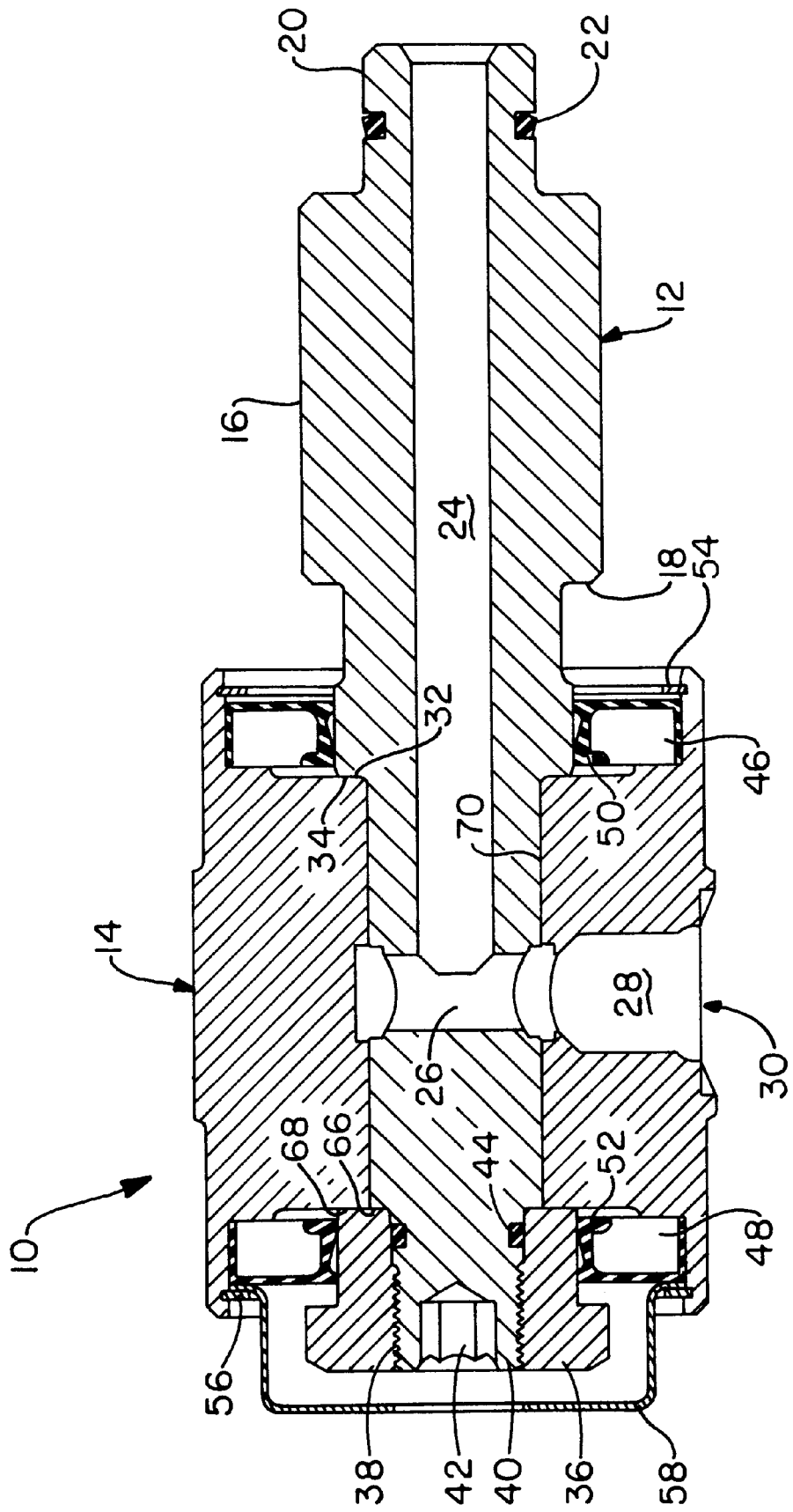
FIG. 2 is a cross sectional view of the rotary union of FIG. 1, taken along the line 2—2, absent the radially extending port along that line.

Referring now to the drawings and more particularly FIGS. 1 and 2, it can be seen that a hydrostatic rotary union made in accordance with the invention is designated generally by the numeral 10. The rotary union 10 includes a shaft 12 received by a housing 14. For purposes which will become apparent later herein, the shaft 12 is preferably of a steel construction, and the housing 14 is of a bronze or aluminum structure. As a result, the shaft 12 and housing 14 have different coefficients of thermal expansion such that if frictional rubbing occurs between the two, the heat generated thereby will cause the housing 14 to expand to a greater degree than the shaft 12, providing clearance therebetween and eliminating the friction or rubbing which would otherwise be injurious to the unit as a whole.

As shown, the shaft 12 has an enlarged body portion 16 which is configured to be received within a rotary shaft of a piece of industrial equipment in such a manner as to retrofit with a standard cartridge-type in-the-shaft rotary union. A shoulder 18 is defined at an upper end of the enlarged body portion 16 and is configured to be secured and maintained by an appropriate keeper plate (not shown) which is bolted or otherwise secured to the piece of industrial equipment. The utilization of such keeper plates is well known and understood by those skilled in the art. Extending from the enlarged body portion 16 at the end thereof opposite the shoulder 18 is an end tip 20, of a diameter reduced from that of the body portion 16, as shown. Again, it will be appreciated that the body portion 16 and tip 20 are specifically configured to be received within a housed-out portion of the rotary shaft of a piece of industrial equipment and to retrofit for the standard cartridge-type rotary union. Of course, it will be appreciated that the specific configuration of the portion of the hydrostatic rotary union 10 which is received by the rotary shaft of the industrial equipment can take any of numerous configurations while remaining within the confines of the invention. For example, the shaft 12 may be threaded for receipt by the rotary shaft of the piece of equipment. A ring seal 22 is received within a groove within the tip 20 and is positioned to seal against the receiving bore of the machinery receiving the rotary union 10 and thereby preventing leakage.

As particularly shown in FIG. 2, an axial passage 24 extends through a major portion of the shaft 12 and engages a radial passage 26 therein. The radial passage 26 communicates with a radial passage 28 within the housing 14, as shown. An O-ring port 30, establishing an inlet port for hydraulic fluid or the like, provides for mating engagement with a fluid source. Again, the fluid may be hydraulic fluid, lubricant, or coolant—or any combination thereof. It will be appreciated by those skilled in the art that the fluid is introduced from a source, through the inlet O-ring port 30, through the radial passage 28 to the radial passage 26 and thence to the axial passage 24 and ultimately to a rotary shaft of the piece of equipment employing the same.

As particularly shown in FIG. 2, an end corner 32 of the housing 14 seats upon a shoulder 34 of the shaft 12. This seating is accomplished by retainer nut 36 threaded as at 38 onto a necked down end 40 of the shaft 12. An internal hexagonal recess 42 is provided in the end 40 of the shaft 12 to receive an allen wrench or other appropriate tool to secure the shaft 12 while the retainer nut 36 is threaded thereto. As shown in FIG. 2, the retainer nut 36 bottoms out at such a point as to engage the shoulder 66 of the shaft 12 and an end surface 68 of the housing 14 at the same time that the end corner 32 of the housing 14 comes into close tolerance proximity to the shoulder 34 of the shaft 12. As shown, an O-ring seal 44 is received by the shaft 12 and is in sealing engagement with an interior unthreaded portion of the retainer nut 36 in the assembled position. It will be appreciated that in the embodiment where the shaft 12 is threaded, the hexagonal recess 42 provides a means for actually threading the shaft 12 to a receiving piece of equipment.

As shown in FIGS. 2 and 3, drain annuluses 46, 48 are provided at each end of the housing 14, with each such annulus having a respectively associated annular seal 50, 52 interposed between the shaft 12 and housing 14. The operation and function of the drain annulus will become apparent later herein. Respective retaining rings 54, 56 are maintained in receiving grooves in associated ends of the housing 14 to retain the annular seals 50, 52. It will further be noted that the retaining ring 56 also secures and maintains an end shield 58 over the end of the hydrostatic rotary union 10 having the retainer nut 36 affixed thereto. The shield 58 serves to isolate rotating elements from contact by users and the like.

As particularly shown in FIG. 3, a passage 60 within the housing 14 interconnects the drain annuluses 46, 48 and communicates with a radial passage 62 to an O-ring port 64 defining a drain or return port for the fluid employed by the system utilizing the rotary union. Preferably, the ports 30, 62 are standard SAE O-ring ports.

In use, it will be appreciated that appropriate fluid is introduced, on demand, through the inlet port 30, radial passages 28, 26 and through the axial passage 24 to the member to be serviced. In the event that the member is a wet clutch/brake, the fluid would typically be a hydraulic fluid, serving purposes of hydraulic actuation, lubrication and cooling. Of course, other fluids can be employed for other purposes. This same hydraulic fluid also passes to the interface 70 between the shaft 12 and housing 14. This fluid (preferably hydraulic oil) provides oil squeeze film damping between the fixed housing 14 and the rotatable shaft 12. In this regard, a tight tolerance is maintained between the shaft 12 and the housing 14 such that the oil film therebetween is of a minimal thickness and the effect of the oil squeeze film damping is maximized. In this regard, the housing 14 and the shaft 12 are manufactured to a tight tolerance fit. Similarly, though not as critical, there is a tight tolerance maintained between the axial interfaces as well. In this regard, the shaft 12, housing 14 and retainer nut 36 are configured such that a tight tolerance clearance is maintained between the end corner 32 of the housing 14 and the shoulder 34 of the shaft 12 at one end of the structure, and between the bottom surface of the retainer nut 36 and the shoulder 66 of the shaft 12 and end 68 of the housing 14 at the other. Preferably, the various clearances between the shaft 12, housing 14, and retainer nut 36 are on the order of 0.005–0.020 inch axial, and 0.0005–0.005 inch diametral, although in most contemplated applications the diametral clearance would not exceed 0.003 inch. Such clearances are, of course, dependent on fluid viscosity, operating pressures, and leakage acceptance.

It will be appreciated that when hydraulic fluid is applied under pressure at the inlet 30, the pressurized hydraulic fluid which controls the wet clutch/brake or other implements communicating with the axial passage 24 all provide lubrication and oil squeeze film damping at the interfaces of the rotary union itself. Accordingly, the hydrostatic rotary union 12 is ideal for implementation with press operations. Lubrication and oil squeeze film damping is obtained when needed—when the system is pressurized to control the associated wet clutch/brake. Moreover, the same oil which operates the wet clutch/brake also serves to lubricate the rotary, provides oil squeeze film damping, and establishes both a bearing and a seal between the stationary and rotating parts thereof.

Those skilled in the art will readily appreciate that the oil which passes through the interface 70 between the rotatable shaft 12, stationary housing 14 and the retainer nut 36 ultimately passes to an appropriate drain annulus 46, 48 and thence through the passages 60, 62 to the drain port 64. Accordingly, the rotary union 10 does not experience leakage, and all interfaces thereof are fully lubricated and provided with a hydrostatic bearing and seal provided by oil squeeze film damping. Although the oil is introduced at the port 30 under significant pressure, the seal established by the close tolerance clearances at the interface to 70 results in the annuluses 46,48 being substantially at atmospheric pressure.

As presented above, the shaft 12 is preferably of steel, while the housing 14 is of bronze or aluminum construction. With the coefficient of thermal expansion of aluminum and bronze being greater than that of steel, any excessive heat generation in the rotary union 10, resulting from frictional engagement between the housing and shaft, will result in a separation of the housing and shaft, thereby providing a remedy for the interference. Accordingly, the system is self modulating to eliminate frictional contacting engagement between the stationary housing 14 and rotatable shaft 12. In this regard, it is desired that the interface between the housing 14 and the shaft 12 be of an anti-seizure material to guard against galling or spalling. A suitable material for this purpose is bronze. Accordingly, the inner surface of the housing 14 is preferably of bronze. To achieve this, the entire housing 14 may be bronze, or it may be of another suitable material such as aluminum, with a bronze inner circumferential layer or sleeve.

It should now be readily apparent to those skilled in the art that the concept of the invention has provided a hydrostatic rotary union which eliminates the need for antifriction bearings and face seals, and which will necessarily provide extended life. Moreover, the invention provides a somewhat simplistic rotary union which may be easily assembled on site. With body 16 of the shaft 12 received by the rotary shaft of the associated equipment, the housing 14 and the associated seals 50, 52 can be removed and replaced with ease. The retaining ring 56 is first removed such that the shield 58 can be removed and access made to the retainer nut 36. An alien wrench or other appropriate retaining device can then be inserted into the internal hex 42 to retain the shaft 12 while the retainer nut 36 is removed. The entire housing assembly 14, with associated seals 50, 52 can then be removed and, if desired, the seals replaced or other service undertaken. Replacement of the housing simply follows a reverse operation.

Thus it can be seen that the objects of the invention have been satisfied by the structure presented above. While in accordance with the patent statutes only the best mode and preferred embodiment of the invention has been presented and described in detail, the invention is not limited thereto or thereby. Accordingly, for an appreciation of the true scope and breadth of the invention reference should be made to the following claims.

What is claimed is:

1. A hydrostatic rotary union, comprising:
    a shaft having an axial passage therein;
    a housing having a radial passage therein, said housing receiving said shaft and said radial passage being in fluid communication with said axial passage;
    a retainer securing said shaft to said housing; and
    wherein said shaft and housing have both a radial and an axial clearance therebetween establishing both a radial and an axial squeeze film bearing therebetween, said radial squeeze film bearing supporting said housing upon said shaft and said axial squeeze film bearing limiting forceful axial contact therebetween.

2. The hydrostatic rotary union according to claim 1, wherein said radial clearance further establishes a fluid seal between said shaft and housing.

3. The hydrostatic rotary union according to claim 2, wherein said housing has first and second axially disposed ends and a drain annulus at each said end.

4. The hydrostatic rotary union according to claim 3, wherein said drain annuluses are interconnected by a passage to a drain port.

5. The hydrostatic rotary union according to claim 3, wherein each of said drain annuluses has an associated annular seal therein interposed between said housing and said shaft.

6. The hydrostatic rotary union according to claim 2, wherein said housing and said shaft are of materials having different coefficients of thermal expansion.

7. The hydrostatic rotary union according to claim 6, wherein said housing has a coefficient of thermal expansion greater than that of said shaft.

8. The hydrostatic rotary union according to claim 7, wherein said shaft is of steel construction.

9. The hydrostatic rotary union according to claim 7, further comprising a retainer nut threaded upon a first end of said shaft, said retainer nut fixedly maintaining said housing upon said shaft.

10. The hydrostatic rotary union according to claim 9, wherein said shaft has a receptacle at said first end configured to receive a tool.

11. The hydrostatic rotary union according to claim 10, further comprising a shield received by said housing and covering said retaining nut.

12. A hydrostatic union, comprising:
    a housing having a radial passage therein;
    a shaft axially received in said housing, said shaft having an axial passage in communication with said radial passage, said shaft further being configured at a first end thereof to be secured from rotation by a tool;
    a retainer nut received upon said first end of said shaft and maintaining said shaft in said housing; and
    wherein said housing and shaft are maintained in close diametral and axial clearance establishing a squeeze film bearing and seal therebetween, said axial clearance being on the order of 0.005–0.020 inch and said diametral clearance being on the order of 0.0005–0.005 inch.

13. The hydrostatic rotary union according to claim 12, wherein said housing is of a material having a greater coefficient of thermal expansion than a coefficient of thermal expansion of said shaft.

14. The hydrostatic rotary union according to claim 12, further comprising a drain annulus between said housing and said shaft at opposite ends of said housing.

15. The hydrostatic rotary union according to claim 14, further comprising an annular seal interposed between said housing and shaft at each said drain annulus.

16. The hydrostatic rotary union according to claim 12, further comprising a shield received by said housing and covering said retainer nut.

17. A hydrostatic rotary union, comprising:
    a shaft having an axial passage therein;
    a housing having a radial passage therein, said axial and radial passages being in communication, said housing receiving said shaft in close axial and radial engagement and defining squeeze film bearings and seal between said shaft and housing, a radial squeeze film bearing supporting said housing upon said shaft, and an axial squeeze film bearing dampening forceful axial contact between said housing and shaft; and
    wherein said housing is made of a material having a coefficient of thermal expansion exceeding that of said shaft.

18. The hydrostatic rotary union according to claim 17, wherein each of opposite ends of said housing has a drain annulus thereat.

19. The hydrostatic rotary union according to claim 18, wherein said radial passage is connected to a pressurized source of fluid and said drain annuluses are connected to an unpressurized drain.

* * * * *

(12) REEXAMINATION CERTIFICATE (4537th)
United States Patent
Heidenreich et al.

(10) Number: US 6,109,659 C1
(45) Certificate Issued: Feb. 26, 2002

(54) HYDROSTATIC ROTARY UNION

(75) Inventors: David C. Heidenreich; Marcus H. Collins, both of Akron, OH (US)

(73) Assignee: Power Transmission Technology, Inc., Sharon Center, OH (US)

Reexamination Request:
No. 90/005,862, Nov. 20, 2000

Reexamination Certificate for:
Patent No.: 6,109,659
Issued: Aug. 29, 2000
Appl. No.: 09/096,907
Filed: Jun. 12, 1998

(51) Int. Cl.$^7$ ............................................. F16L 55/00
(52) U.S. Cl. ..................... 285/13; 285/94; 285/905; 285/190; 285/329; 285/121.5; 100/282; 184/6.14
(58) Field of Search ........................... 285/13, 14, 190, 285/94, 98, 272, 273, 274, 187, 329, 121.5, 904, 905; 100/282, 299, 280; 184/6.14

(56) References Cited

U.S. PATENT DOCUMENTS 5,901,643 A 5/1999 Bornhorst

OTHER PUBLICATIONS

Cast Bronze Hydrostatic Bearing Design Manual, $2^{nd}$ Ed., Fourth Printing, Aug. 1975, pp. 28–30 and pp. 44–45.

Cast Bronze Bearing Design Manual, Copyrighted 1959 & 1960, pp. 46–49.

Primary Examiner—Eric K. Nicholson

(57) ABSTRACT

A hydrostatic rotary union has a shaft with an axial passage therethrough received within a housing having a radial passage in fluid communication with the axial passage. The shaft and housing have a radial clearance between them which establishes a squeeze film bearing and seal, when in use. End annuluses receive the oil establishing a squeeze film bearing and provide a return path to a supply source. The inner circumferential portion of the housing interfacing with the shaft is preferably of an anti-seizure material, such as bronze. Moreover, the housing and shaft are of materials of different coefficients of thermal expansion, such that excessive heat generated at the interface between the housing and shaft will cause the housing to expand away from the shaft.

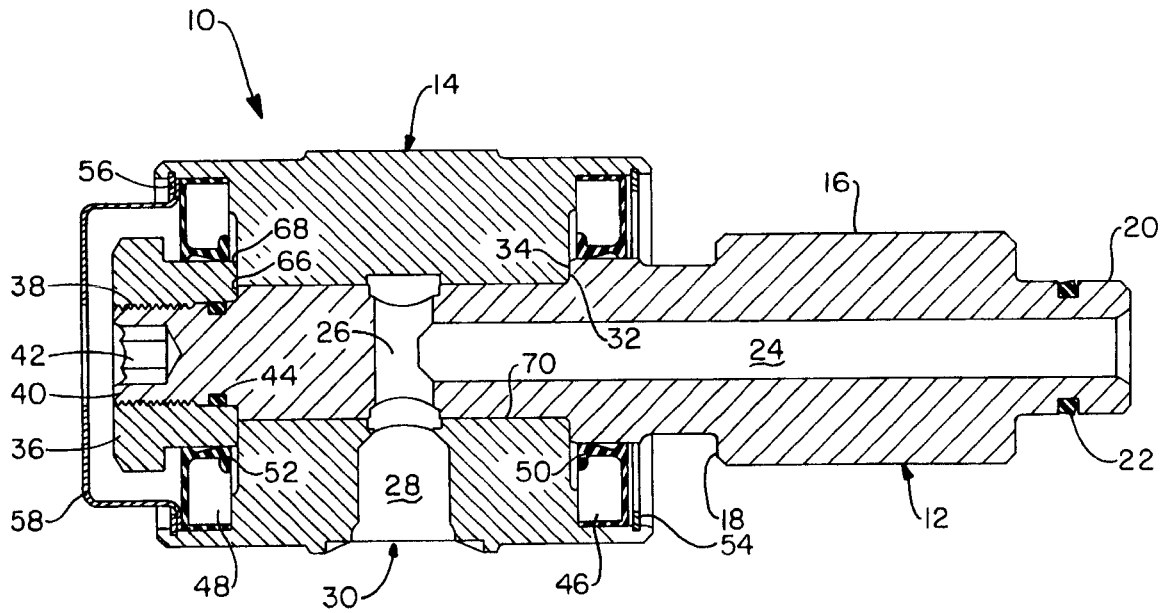

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–19 is confirmed.

\* \* \* \* \*